United States Patent [19]

Bryant et al.

[11] Patent Number: 5,047,110
[45] Date of Patent: Sep. 10, 1991

[54] APPARATUS FOR POSTCURE MARKING AND DECORATING TIRES

[75] Inventors: Lynn A. Bryant, Canton; Joseph H. Tazewell; Durward T. Roberts, Jr., both of Akron, all of Ohio

[73] Assignee: Bridgestone/Firestone, Inc., Akron, Ohio

[21] Appl. No.: 339,835

[22] Filed: Apr. 18, 1989

[51] Int. Cl.⁵ .................................................. B32B 31/00
[52] U.S. Cl. ................................... 156/540; 156/110.1; 156/116; 156/230; 152/524
[58] Field of Search ............ 156/230, 540, 541, 110.1, 156/116; 152/524

[56] References Cited

U.S. PATENT DOCUMENTS

| | | | |
|---|---|---|---|
| 4,256,159 | 3/1981 | Williams | 156/116 X |
| 4,645,555 | 2/1987 | Kuboyama | 156/230 X |
| 4,735,854 | 4/1988 | Lauchenauer | 156/230 X |

FOREIGN PATENT DOCUMENTS

| | | | |
|---|---|---|---|
| 566711 | 11/1958 | Canada | 156/230 |
| 54-69190 | 6/1979 | Japan | 156/230 |
| 1259615 | 1/1972 | United Kingdom | 156/116 |

Primary Examiner—Robert L. Lindsay
Attorney, Agent, or Firm—Daniel N. Hall

[57] ABSTRACT

An apparatus and technique for applying markings or decorations to the sidewall of a cured tire. A thin polyester carrier sheet has a thermoplastic transfer stock thereon. A heated die is provided having thereon the geometric configuration of the desired marking or decoration. The heated die is urged against the transfer laminate to impinge the transfer stock against the sidewall of the cured tire. The heat of the die effects a release of the transfer stock from the carrier sheet in areas congruent with the indicia carrier by the die. The affinity of the transfer stock for the tire is greater than its affinity for the carrier sheet and the transfer is thus made.

18 Claims, 1 Drawing Sheet

APPARATUS FOR POSTCURE MARKING AND DECORATING TIRES

TECHNICAL FIELD

The invention herein resides in the art of pneumatic tire manufacture. More particularly, the invention relates to a technique and apparatus for imparting indicia or decorations to the sidewalls of a tire following cure.

BACKGROUND ART

Heretofore, the need for applying indicia or decorations to the sidewall of a tire has been well known. For example, it has been known to provide what are commonly called "white sidewall" tires in which a ring of white rubber is uniformly placed about the sidewall of the tire. Further, it has well been known to apply specific identifying or grading codes to the sidewall of a tire for purposes of indicating grade, uniformity, identification, and the like.

Generally, tires are marked using inks and paints which are commercially available. These materials are stamped, stenciled, labeled or painted onto the tires for identification and uniformity grading codes, and the like. The marks are not considered permanent, but may be washed or peeled off the tire. In like manner, decorating of tires is generally accomplished prior to cure, using a coextruded white and black sidewall inlay.

The prior art process for marking tires is both labor intensive and expensive to implement and messy in use. Some of the markings are given to smearing, and are often of varying density or clarity. Further, the prior art method of decorating the sidewall of a tire with a coextruded black and white rubber inlay is both expensive, time consuming and given to the occurrence of blemishes in the decorative area itself. Further, the prior art techniques and structure for marking tires is not given to ease of repair, in the event of a damaged or marred marking.

In light of the foregoing, there is a need in the art for a simple and inexpensive method for imparting indicia to a tire with a high degree of clarity and resolution. There is a similar need for applying decorative markings to the sidewall of a tire in a similar manner. As importantly, it is most desirable to impart indicia and decorations to tire sidewalls in a manner which is inexpensive to implement and yet results in an application which is reliable and durable in use. Further, it is most desirable to provide such decoration, indicia, and markings on the sidewall of a tire by such a means as is conducive to repair or "touch-up" in the event of marring or the like.

DISCLOSURE OF INVENTION

In light of the foregoing, it is the first aspect of the invention to provide a method and apparatus for postcure marking and decorating tires in which no liquid coatings are employed.

A further aspect of the invention is the provision of a method and apparatus for postcure marking and decorating tires in which sharp clarity, high resolution, and uniform density of the marking is obtained.

Another aspect of the invention is the provision of a method and apparatus for postcure marking and decorating tires wherein such marking and decoration may be of a high quality, notwithstanding the fact that application is made following the curing operation.

Yet a further aspect of the invention is the provision of a method and apparatus for postcure marking and decorating tires in which the marking and decorations may be repaired in the event of marring or the like.

The foregoing and other aspects of the invention which will become apparent as the detailed description proceeds are achieved by apparatus for imparting notable markings on a tire, comprising: a laminate having a carrier sheet which receives a transfer layer thereon; and a die operative for engaging such carrier sheet and urging said transfer layer into contacting engagement with the tire.

Further aspects of the invention are attained by apparatus for imparting markings on a tire, comprising: a laminate having a polymeric carrier sheet having thereon a thermoplastic elastomer transfer layer; and a heated die reciprocatingly movable to and from the tire, said die contacting said carrier sheet and urging said transfer layer into contacting engagement with the tire.

Yet additional aspects of the invention are attained by a method for placing indicia on a cured tire, comprising: passing an alignment of cured tires along a line; traversing said line with a web of transfer laminate; and impinging a portion of said web upon the tire when said portion of said web and the tire are aligned.

DESCRIPTION OF DRAWINGS

For a complete understanding of the objects, techniques and structure of the invention, reference should be had to the following detailed description and accompanying drawings wherein.

BEST MODE FOR CARRYING OUT THE INVENTION

Figure 1:
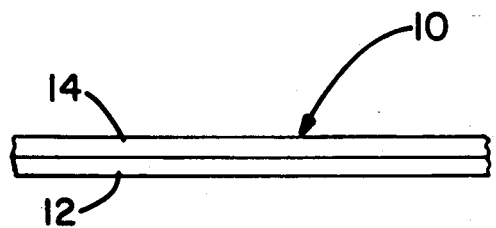
FIG. 1 is a side elevational view of the transfer laminate of the invention.

Referring now to the drawings and more particularly FIG. 1, a transfer laminate made in accordance with the invention is designated generally by the numeral 10. As shown, the laminate 10 comprises a carrier or backing sheet 12 which, in a preferred embodiment, is a polymer film, such as polyester or MYLAR and TEDLAR. In such an embodiment, the carrier or backing sheet 12 may be rather thin, on the order of 0.001–0.003 inch. In such an embodiment, the carrier on backing sheet 12 may comprise a paper sheet, appropriately treated to have a release layer thereon such as silicone.

Received upon the carrier sheet 12 is a face sheet 14 of suitable transfer stock. Where the carrier sheet 12 is a coated release paper, the face sheet 14 will, of course, be received on the treated surface. The layer 14 may be made of any suitable thermoplastic elastomer material such as rubber, hydrogenated styrene-butadiene block copolymers, or suitable dry film ink. Again, the face sheet 12 will have a thickness on the order of 0.001–0.005 inch, and a width sufficient to satisfy the intended purpose as will become apparent hereinafter. It will be appreciated that the thickness of the face sheet will depend, in large part, on the nature of the material comprising the transfer stock.

The concept of the invention is not limited to any particular transfer stock comprising the sheet 14, but any of numerous compositions may be employed within the confines of the invention. By way of further example, but not limitation, polymers such as hydrogenated styrene-butadiene-styrene block copolymers, hydrogenated styrene-isoprene-styrene block copolymers, HYPALON, silicones, butyl, brombutyl, chlorobutyl, urethanes, and the like may be employed. Utilizing such materials, titanium dioxide, zinc oxide, or zinc stearate may be employed as suitable pigments, it being understood that colored pigments may be used as well. A preferred solvent for such a composition is an aromatic hydrocarbon, but the transfer stock dictates the optimal solvent. Additional ingredients such as surfactants, antioxidants, and antiozonants may be employed if desired, although it has been found that in some instances such are not necessary.

It has further been found that certain ionic polymers may be used as the binder or resin to form the transfer stock of the layer 14. For example, an ethylene copolymer and a vinyl monomer with a pendent acid group such as methacrylic acid may be readily employed as a base material for such a layer. It will be appreciated by those skilled in the art that a number of other ionic elastomers or ionomers may also be used.

Figure 2:
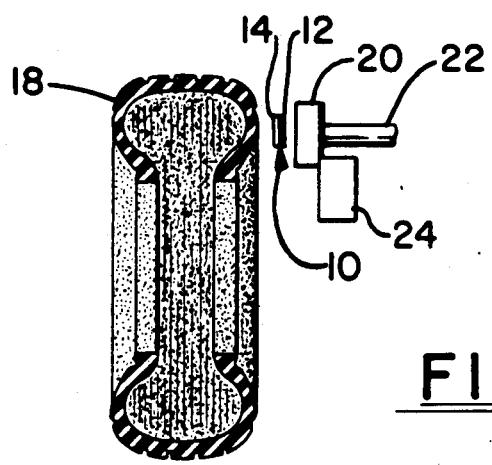
FIG. 2 is an illustrative view of the marking transfer mechanism of the invention.

FIG. 2 shows a system 16 suitable for attaining a decal transfer according to the invention. Here, a cured tire 18 is moved into juxtaposition with a die 20 carrying thereon the configuration of the design or indicia to be imparted to the tire 18. In a preferred embodiment of the invention, the die 20 comprises a heated iron, the temperature of which may be controlled or regulated to achieve the desired transfer, the temperature of the same being a function of the transfer material employed.

The die 20 has a shaft 22 extended therefrom which is adapted for reciprocating movement, urging the die 20 toward and away from the tire 18. As shown, the transfer laminate 10 is interposed between the die 20 and the tire 18, the face sheet 14 facing the tire 18, and the carrier 12 facing the die 20. The reciprocating shaft 22 urges the die 20 toward the tire 18 to impinge the face sheet 14 thereagainst.

Figure 3:
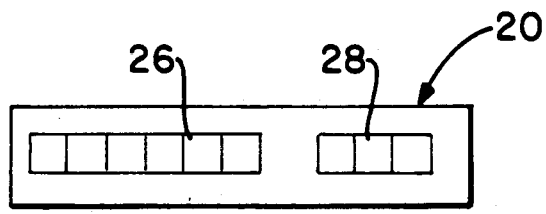
FIG. 3 is a front plan view of the iron or die employed in the concept of the invention.

As shown in FIG. 3, the die 20 may contain thereon various areas of indicia 26,28 which, in this instance, may be coding letters, numerals, or other characters. Of course, teh die 20 could carry decorative designs as well. Indeed, it will be readily apparent to those skilled in the art that the areas 26,28 could be decorative, contain codes, provide registration numbers or markings, exhibit marks for assisting in tire balancing, and the like. When the areas 26,28 are representative of codes or the like, there is also provided a cam or indexing means 24 in communication with the die 20 for advancing or otherwise changing the indicia at 26,28 in association with each reciprocating movement of the shaft 20 to assure that the proper marking is placed upon the tire 18.

It is also contemplated as a portion of the invention that the transfer stock of the face sheet 14 may itself be configured in the appropriate design of the indicia 26,28, deposited upon the carrier sheet 12 by silk screening or other appropriate means. In such a case, the die 20 may be replaced with a simple pressure plate, having a flat surface, or one which is curved to conform to the contour of the tire sidewall area to be contacted. With such a structure, the indicia 26,28 between the pressure plate 20 and the tire 18 is transferred to the tire.

Figure 4:
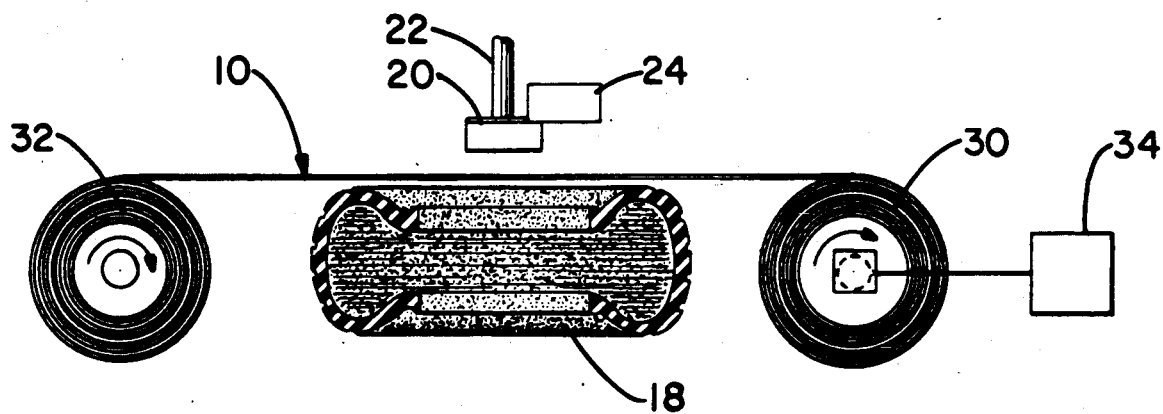
FIG. 4 is a schematic diagram of the tire marking technique of the invention.

Further details of the marking system 16 are shown in FIG. 4. It will be appreciated that a drive spool 30 may be interconnected with a supply spool 32 by means of a web of the transfer laminate 10. The spool 30 thus constitutes the take-up spool, while the spool 32 provides for the laminate supply. A control or indexing device 34 operates in conjunction with the drive spool 30 to increment advancement of the web of transfer laminate 10 for each of the tires 18 moving along a conveyor line or the like. The conveyor line is operative for positioning a tire 18 in juxtaposition to the die 20 and laminate 10 for appropriate marking or decoration.

In operation, a line of tires 18 moves in alignment along a conveyor which is transversed by the web of laminate 10. When the tire 18, web 10, and die 20 are in alignment, the heated die 20 impinges the web 10 onto the sidewall of the tire 18 for a sufficient time to effect the desired transfer. During this time, of course, the conveyor of tires is immobile. After the transfer is completed, the die 20 retracts, the conveyor 20 continues the transport of the tires 18, and the web 10 is indexed for the next subsequent identical operation. If the die 20 includes indicia requiring indexing, such indexing is undertaken by appropriate cam means or under control of the indexing device 34. If, however, the transfer laminate 10 maintains the desired data or decorative configuration thereon, only indexing of the web 10 need be performed by the device 34, and no indexing of the die 20 would be required. Indeed, in such an event, the die 20 would typically be a substantially flat plate as discussed earlier.

Those skilled in the art will understand that the elements 20-34 may comprise a single assembly maintained in juxtaposition to the passing line of tires 18, rather than actually spanning the line. Where the indicia to be imparted to the tire 18 is of small physical size, all of the elements just described may be compactly housed in a single unit capable of performing the requisite indexing and reciprocating movement.

It will be appreciated by those skilled in the art that the die or iron 20 is maintained at a temperature lower than the melting point of the carrier sheet 12, but of sufficient degree to impart that portion of the face sheet 14 which is congruent with the configuration on the die areas 26,28 onto the tire 18. Of course, the material of the face sheet 14 has a greater affinity for the tire 18 than the carrier sheet 12.

While some degree of pressure is necessary to achieve the desired transfer, it has been found that the only requisite pressure is that sufficient for assuring uniform contact between the sidewall of the tire 18 and the transfer stock of the face sheet 14. It has been found in the preferred embodiment of the invention that the die 20 need be at a temperature of 200°–300° C., and most preferably 250°–275° C.. It has also been found that contacting engagement of the laminate 10 between the tire 18 and die 20 need occur over a period of time on the order of 0.5–10 seconds and most preferably 3–5 seconds.

Using the structure and technique presented above, it has been found that the thin nature of the transfer stock 14 allows for clear and crisp transfers of decorations or other indicia onto the tire, the clarity, of course, being further dependent upon the clarity of the areas of indicia 26,28 of the die 20. It has further been found that, in the event the decoration or indicia is marred in use, it can readily be "touched-up" by the simple application of the transfer stock 14 to the marred area under the application of heat as discussed above. Finally, it has been found that the concept of the invention is applicable to any of numerous configurations of marking or decoration.

Thus it can be seen that the objects of the invention have been satisfied by the structure presented hereinabove. While in accordance with the Patent Statutes, only the best mode and preferred embodiment of the invention has been presented and described in detail, it is to be understood that the invention is not limited thereto or thereby. Accordingly, for an appreciation of the true scope and breadth of the invention, reference should be had to the following claims.

What is claimed is:

1. Apparatus for imparting notable markings on a cured tire, comprising:
   a laminate having a carrier sheet which receives a transfer layer thereon, said transfer layer comprising a thermoplastic elastomer material selected from the group of rubber and polymer, hydrogenated styrene-butadiene-styrene block copolymers, hydrogenated styrene-isoprene-styrene block copolymers, silicones, butyl, brombutyl, chlorobutyl, and urethanes; and
   a die operative for engaging said carrier sheet and urging said transfer layer into contacting engagement with the cured tire.

2. The apparatus according to claim 1 wherein said carrier sheet comprises a paper layer having a release coating thereon.

3. The apparatus according to claim 1 wherein said carrier sheet comprises a polyester film.

4. The apparatus according to claim 1 wherein said carrier sheet and transfer layer are each of a thickness of 0.001-0.005 inch.

5. The apparatus according to claim 1 wherein said material of said transfer layer has a greater affinity for the tire than for said carrier sheet.

6. The apparatus according to claim 5 wherein said die is heated.

7. The apparatus according to claim 6 wherein said die is heated to a temperature less than the melting point of the carrier sheet.

8. The apparatus according to claim 7 wherein said transfer layer is maintained in predefined configuration upon said carrier sheet and said die comprises a flat pressure plate.

9. The apparatus according to claim 7 wherein said die is heated to a temperature sufficient to effect transfer of a portion of said transfer layer congruent with said die from said carrier sheet to the tire.

10. The apparatus according to claim 11 wherein said die is adapted for reciprocating movement toward and away from the tire, said reciprocating movement being existent with indexing of said die to change indicia carried thereby.

11. Apparatus for imparting markings onto a cured tire, comprising:
    a laminate having a polymeric carrier sheet having thereon a pigmented or colored thermoplastic transfer layer, said transfer layer being of a material selected from the polymer group of hydrogenate styrene-butadiene-styrene block copolymers, hydrogenated styrene-isoprene-styrene block copolymers, silicones, butyl, brombutyl, chlorobutyl, and urethanes; and
    a heating die reciprocatingly movable to and from the cured tire, said die contacting said carrier sheet and urging said transfer layer into contacting engagement with the cure tire.

12. The apparatus according to claim 11 wherein said die is heated to a temperature sufficient to effectuate transfer of portions of said transfer layer onto the tire, but insufficient to melt said carrier sheet.

13. The apparatus according to claim 12 wherein said die has indicia thereon, the geometric configuration of which defines the marking transferred to the tire.

14. The apparatus according to claim 13 wherein said indicia is altered in conjunction with reciprocating movement of the die.

15. The apparatus according to claim 11 wherein said carrier sheet and transfer layer have individual thicknesses of 0.001-0.003 inch.

16. The apparatus according to claim 15 wherein said carrier sheet is polyester.

17. The apparatus according to claim 11 wherein said die is heated to a temperature of 200°-300° C.

18. The apparatus according to claim 17 wherein said die contacts said carrier sheet and urges said carrier sheet against said tire for 0.5-10 seconds.

* * * * *

UNITED STATES PATENT AND TRADEMARK OFFICE
CERTIFICATE OF CORRECTION

PATENT NO. : 5,047,110

DATED : September 10, 1991

INVENTOR(S) : Lynn A. Bryant, et. al.

It is certified that error appears in the above-indentified patent and that said Letters Patent is hereby corrected as shown below:

Column 6, line 7, "according to claim 11" should be --according to claim 9--.

Column 6, line 17, change "hydrogenate" to --hydrogenated--.

Signed and Sealed this

Fifteenth Day of June, 1993

Attest:

MICHAEL K. KIRK

Attesting Officer

Acting Commissioner of Patents and Trademarks